US007523653B2

(12) United States Patent
Smith et al.

(10) Patent No.: US 7,523,653 B2
(45) Date of Patent: Apr. 28, 2009

(54) EXHAUST TEMPERATURE SENSOR MONITORING

(75) Inventors: Stephen B. Smith, Livonia, MI (US); Shane Elwart, Washtenaw, MI (US); Michael Igor Kluzner, Oak Park, MI (US); Jason Aaron Lupescu, Ypsilanti, MI (US)

(73) Assignee: Ford Gobal Technologies, LLC, Dearborn, MI (US)

( * ) Notice: Subject to any disclaimer, the term of this patent is extended or adjusted under 35 U.S.C. 154(b) by 101 days.

(21) Appl. No.: 11/763,396

(22) Filed: Jun. 14, 2007

(65) Prior Publication Data

US 2008/0307851 A1 Dec. 18, 2008

(51) Int. Cl.
*G01M 15/10* (2006.01)

(52) U.S. Cl. .................................................. 73/114.69

(58) Field of Classification Search ............. 73/114.69, 73/114.71, 114.72, 114.73, 114.75
See application file for complete search history.

(56) References Cited

U.S. PATENT DOCUMENTS

| | | | |
|---|---|---|---|
| 5,592,815 A | 1/1997 | Jelden et al. | |
| 6,258,232 B1 | 7/2001 | Hasegawa et al. | |
| 6,294,075 B1 | 9/2001 | Poggio et al. | |
| 6,381,952 B1 | 5/2002 | Asanuma et al. | |
| 6,571,602 B2 | 6/2003 | Ohkuma | |
| 6,679,238 B2 | 1/2004 | Nebiyeloul-Kifle et al. | |
| 6,990,854 B2 | 1/2006 | van Nieuwstadt et al. | |
| 7,114,324 B2 | 10/2006 | Hoard et al. | |
| 7,286,926 B2 * | 10/2007 | Gotoh et al. | 701/114 |
| 2003/0019865 A1 | 1/2003 | Whitney et al. | |
| 2003/0097873 A1 * | 5/2003 | Surnilla | 73/118.1 |
| 2003/0178016 A1 * | 9/2003 | Nebiyeloul-Kifle et al. | 123/676 |
| 2005/0102076 A1 | 5/2005 | Kariya et al. | |
| 2006/0117737 A1 | 6/2006 | Ohsaki | |
| 2007/0010932 A1 * | 1/2007 | Gotoh et al. | 701/114 |
| 2007/0052454 A1 | 3/2007 | Gose et al. | |

* cited by examiner

*Primary Examiner*—Eric S McCall
(74) *Attorney, Agent, or Firm*—Allan J. Lippa; Alleman Hall McCoy Russell & Tuttle LLP

(57) ABSTRACT

A system for diagnosing an exhaust temperature sensor in an engine exhaust, the exhaust further including an emission control device, the system comprising an exhaust temperature sensor disposed in the exhaust pathway for indicating temperature; an air/fuel ratio sensor having a heater, the air/fuel ratio sensor disposed in the exhaust pathway; and a control system, the control system enabling and disabling the air/fuel ratio sensor heater based on operating conditions, the controller further adjusting fuel injection to provide a desired air-fuel ratio based on feedback from the air/fuel ratio sensor when the heater is enabled, and determining degradation of the exhaust temperature sensor based on a signal from the air/fuel ratio sensor when the heater is disabled.

20 Claims, 8 Drawing Sheets

EXHAUST TEMPERATURE SENSOR MONITORING

BACKGROUND AND SUMMARY

Exhaust temperature sensor(s) may be provided to monitor the temperature of an emission control device in an engine exhaust system. These sensors may be placed near or in the emission control device to provide accurate temperature readings. In some examples, additional exhaust temperature sensors have been used to evaluate whether the exhaust temperature sensors placed inside an emission control device, for example, are providing accurate exhaust temperature readings. However, having additional exhaust temperature sensors may be costly, and may create further diagnostic requirements.

As an alternative, exhaust gas sensors, such as air-fuel ratio (AFR) sensors, have been used. For example, JP 2000-227364 provides a method that uses an AFR sensor. The AFR sensor heater is temporarily deactivated while it is used for air-fuel ratio measurement. The exhaust temperature is then estimated based on the AFR sensor heater resistance, which is measured using a small current. The above-mentioned technique, however, may degrade engine operation since it may require placing an active AFR sensor temporarily out of service when it is needed for a feedback control of air-fuel ratio control during engine operation.

As a further alternative, as provided by US patent application 2006/0117737, the AFR sensor is kept active and the exhaust temperature is estimated from the amount of heat released from the AFR sensor heater. However, to accurately estimate the exhaust temperature from the heat released from the heater, one must accurately determine the correlation coefficient(s) used to correlate the heat released to the exhaust temperature. The correlation coefficient(s) may be affected by various factors that may or may not be accurately determined and/or controlled. For example, the correlation coefficient(s) may be affected by the exhaust gas mix (e.g., the relative contents of $H_2O$, CO, $CO_2$, CH, and NOx), the exhaust flow rate, and the exhaust flow pattern. Failure to accurately determine the correlation coefficient(s) may render the exhaust temperature estimation inaccurate and unreliable.

The applicants herein recognize that the above mentioned interrelated issues may at least be partially addressed by providing a system for diagnosing an exhaust temperature sensor in an engine exhaust; the exhaust further including an emission control device, the system comprising an exhaust temperature sensor disposed in the exhaust pathway for indicating temperature; an air-fuel ratio sensor having a heater, the air-fuel ratio sensor disposed in the exhaust pathway; a control system, the control system enabling and disabling the air-fuel ratio sensor heater based on operating conditions, the controller further adjusting fuel injection to provide a desired air-fuel ratio based on feedback from the air-fuel ratio sensor when the heater is enabled, and determining degradation of the exhaust temperature sensor based on the air-fuel ratio sensor when the heater is disabled.

In this way, it is possible to take advantage of the opportunities associated with using the air-fuel ratio sensor to accurately diagnose temperature sensor operation under conditions where the air-fuel ratio sensor is either unneeded or unable to provide air-fuel ratio feedback information, since the temperature reading from the air-fuel ratio sensor is needed only under select diagnostic conditions. Thus, during certain engine operating conditions, such as cold start and engine lean burn combustion, a heater for one or more AFR sensors may be temporarily turned off, (as when measuring air/fuel ratio is either not possible or unnecessary) and the sensor may then be used to determine exhaust temperature (e.g., on the basis of exhaust temperature indicative signal(s) received from the AFR sensor(s), such as an AFR sensor heater impedance or a time function of an sensor heater impedance). The estimated exhaust temperature may in turn be used for a number of different purposes, including as an indication of the actual exhaust temperature, as a reference for diagnosing the functionality of an adjacent exhaust temperature sensor, and/or as a basis for recalibrating the exhaust temperature sensor, in some instances, the estimated exhaust temperature may be adjusted for thermal contribution of one or more emission control devices to the exhaust.

DETAILED DESCRIPTION

Figure 1:
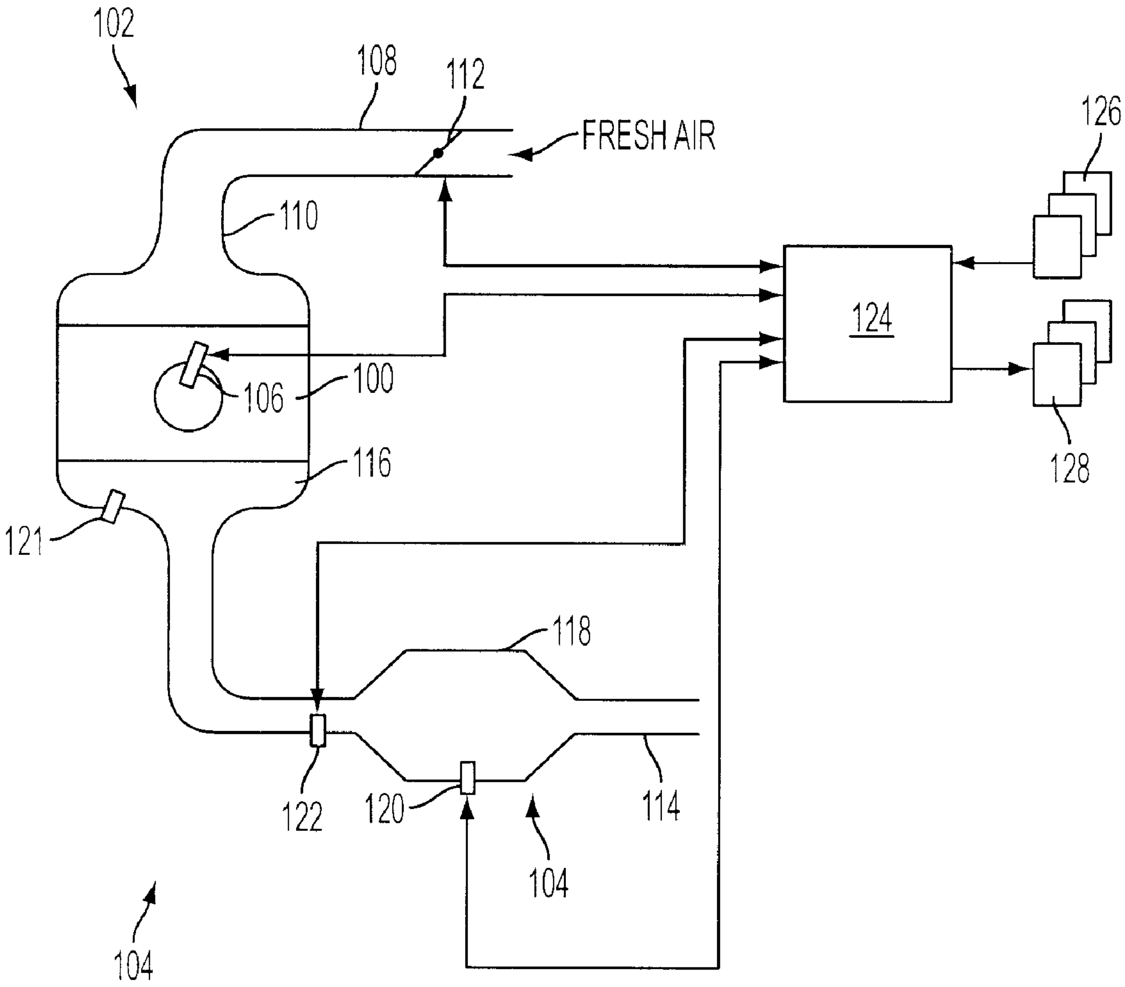
FIG. 1 illustrates an example exhaust temperature sensor diagnostic system.

FIG. 1 illustrates an exhaust temperature sensor diagnostic system. The system is shown to include an engine 100 coupled to an intake system 102 and an exhaust system 104.

The engine is shown to include an injector 106 for each cylinder. Each engine cylinder may also include an intake valve (not shown) and exhaust valve (not shown). Although only one cylinder is shown, engine 100 may be a multi-cylinder engine.

The intake system 102 is shown to include an intake pathway 108 coupled to the engine 100 through an intake manifold 110. The intake system 102 is also shown to include an intake throttle 112 position in the intake pathway 108.

The exhaust system 104 is shown to include an exhaust pathway 114 coupled to the engine 100 through an exhaust manifold 116. The exhaust system 104 is shown to include an emission control device 118 with an exhaust temperature sensor 120 positioned inside the emission control device 118. An additional exhaust temperature sensor 121 is positioned in the exhaust manifold 116. An exhaust gas sensor 122 that may function as an air/fuel ratio sensor is positioned in the exhaust pathway 114 downstream of the exhaust manifold 116 and upstream of the emission control device 118.

The system is shown to further include a control unit 124. The control unit 124 is shown to receive information from the injector 106, the intake throttle 112, the exhaust temperature sensor 120, the AFR sensor 122, and additionally shown to receive inputs from various other sensors 126, including for example intake valves (not shown) and exhaust valves (not shown). The control unit 124 is further shown to control the operation of the injector 106, the intake throttle 112, the exhaust temperature sensor 120, the AFR sensor 122, and various other actuators 128, including for example controlling the operation of the intake valves (not shown) through an intake valve controller (not shown) and the exhaust valves (not shown) through an exhaust valve controller (not shown).

The engine 100 may be one or more various types of internal combustion engines. Individual cylinders may operate in various combustion modes and various displacement modes, may transition among the various combustion and/or displacement modes, may use different stroke cycles, and/or burn different types of fuels, etc.

Although the intake system 102 is shown to include one intake pathway 108, multiple intake pathways may be provided. The intake system 102 may further include components that are not shown or described herein. For example, it may include one or more intake air cleaners or filters, turbochargers, valves, bypasses, heat exchangers and/or heaters, temperature sensors, pressure sensors, mass air flow sensors, and/or exhaust gas sensors, etc.

Although the exhaust system 104 is shown to include only one exhaust pathway, additional exhaust pathways, bypasses, and exhaust recirculation pathways may be provided. The exhaust system may include other components not shown or described herein. For example, it may include additional emission control devices, temperature sensors, pressure sensors, and/or exhaust gas sensors. The exhaust system may further include additional valves, such as bypass valves, exhaust gas recirculation valves, and/or exhaust throttle valves.

Although one emission control device 118 is shown, multiple emission control devices may be provided. The emission control device 118 may be any emission control device suitable for a given engine system. For example, it may be a particulate filter, a three-way catalytic converter, a lean NOx trap, or combinations thereof.

Although two exhaust temperature sensors are provided in this example, in other examples, one or multiple exhaust temperature sensors may be provided. Further, although the exhaust temperature sensors are provided inside the emission control device 118 and the exhaust manifold 116, exhaust temperature sensors may be positioned at various locations in the exhaust system.

Although the AFR sensor 122 is a heated exhaust gas oxygen sensor (HEGO) in this example, the AFR sensor may be of other types of exhaust gas sensors capable of sensing exhaust components that are indicative of air/fuel ratio, for example an universal exhaust gas oxygen sensor (UEGO), NOx/UEGO sensor, or combinations thereof.

The control unit 124 may be an engine control unit, powertrain control unit, control system, or combinations of various control units, and may be further coupled to various other sensors 126 and various actuators 128 (e.g., fuel injection actuator, spark ignition actuator, throttle valve actuator, etc) for sensing and controlling the vehicle operating condition. Although one control unit is provided in this example, multiple control units may be provided in other examples.

The control unit 124 may be in the form of a microcomputer, including microprocessor unit (not shown), input/output ports (not shown), an electronic storage medium (not shown) for executable programs and calibration values shown as read only memory chip (not shown), random access memory (not shown), keep alive memory (not shown), and a conventional data bus (not shown).

The control unit 124 may function as a part of an exhaust temperature sensor diagnostic system, by, for example: (1) receiving signals, such as signals indicative of exhaust temperature from one or more exhaust temperature sensor to be diagnosed, and from one or more adjacent AFR sensors that are used as references for diagnosing the exhaust temperature sensor; (2) controlling operations of various vehicular components, such as controlling the activating or deactivating reference heater(s) of AFR sensor(s) based on engine operating conditions; (3) operating the reference AFR sensor(s) for exhaust temperature determination; (4) adjusting the AFR sensor(s) determined temperature for thermal contribution of one or more emission control devices; (5) comparing the exhaust temperature measured by the exhaust temperature sensor to be diagnosed and the exhaust temperature measured by reference AFR sensor(s) to determine whether the exhaust temperature sensor is providing accurate information regarding exhaust temperature; and (6) calibrating the exhaust temperature sensor based on AFR sensor(s) determined temperature; etc.

Under certain operating conditions, such as when the AFR sensors may be turned off or not required for engine operation, such as during engine cold start when the exhaust temperature is at or below dew-point and during lean operation, the exhaust temperature sensor diagnostic system may deactivate one or more AFR sensors for exhaust temperature determination/estimation, and/or exhaust temperature sensor diagnosis. During engine cold start when the exhaust temperature is at or below dew-point, AFR sensor heaters may be turned off to prevent cracking of the sensor ceramic due to a possible rapid evaporation of condensates accumulated on the sensor if the sensor heater were turned on. When the engine is operating under a lean burn or lean combustion, a switching type AFR sensor is generally not needed for air/fuel ratio feedback control, or used only for gross adjustment, during engine operation. The AFR sensor heaters can therefore be turned off. The exhaust temperature may be estimated based on one or more static signals that are indicative of one or more static electrical properties of the sensor heater(s), such as sensor heater voltage, resistance, current, quantity of heat emitted; or based on one or more dynamic signals that are indicative of dynamic electrical properties of the sensor heater(s), such as change of sensor heater voltage, current, heat input or output, quantity of heat emitted, as a function of time.

The estimated exhaust temperature may be adjusted for the thermal contribution of an emission control device. Moreover, the estimated exhaust temperature may provide an indication of the actual exhaust temperature, and/or as a reference for diagnosing the functionality of an adjacent exhaust temperature sensor.

In some examples, the thermal contribution of an emission control device to the exhaust may be adjusted prior to using the estimated exhaust temperature as an indication of the actual exhaust temperature, and/or as a reference for diagnosing the functionality of an adjacent exhaust temperature sensor.

The exhaust temperature sensor diagnostic system may recalibrate the exhaust temperature sensor if the exhaust temperature sensor is malfunctioning and is indeed recalibratable.

Figure 2:
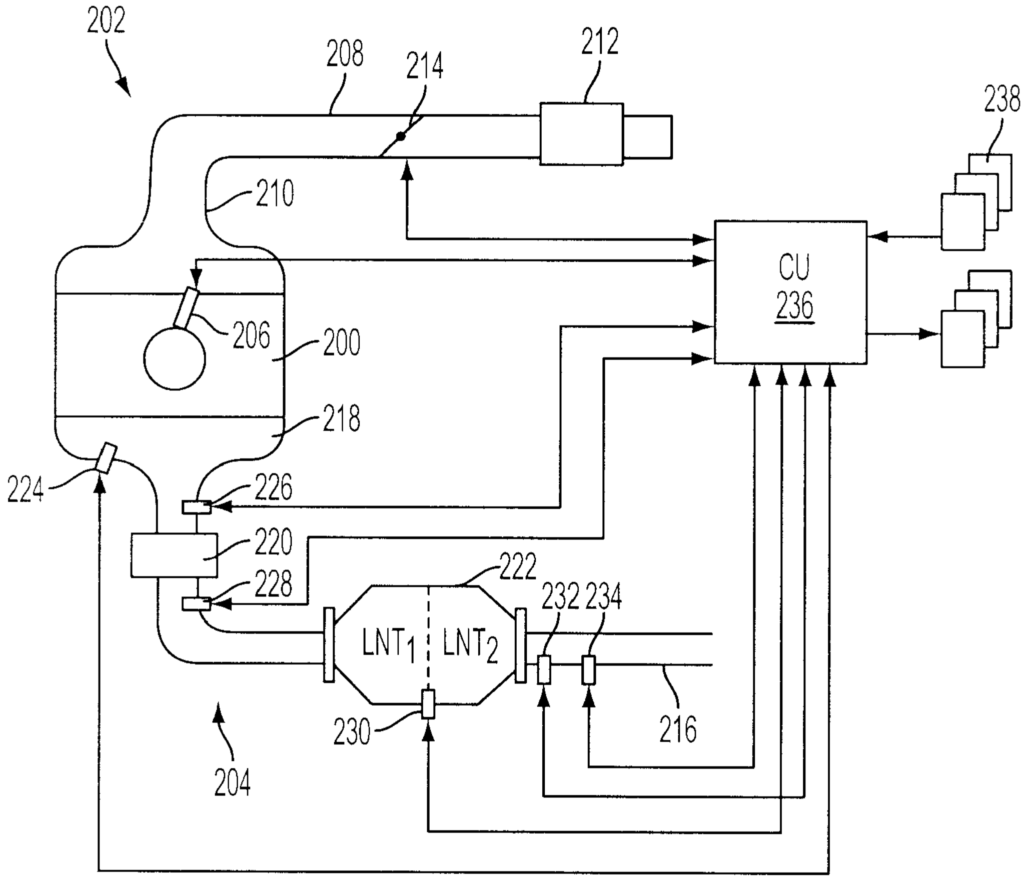
FIG. 2 illustrates another example exhaust temperature sensor diagnostic system.

FIG. 2 illustrates another example exhaust temperature sensor diagnostic system. The various alternatives described in FIG. 1 may be further applied to FIG. 2.

The system may include an engine 200, as well as an intake system 202 and an exhaust system 204 coupled to the engine 200. The exemplary engine 200 in this example is a 4-cylinder engine (although one cylinder is shown). Each cylinder is provided with a fuel injector 206.

The intake system 202 may include an intake pathway 208 coupled to the engine 200 through an intake manifold 210.

The intake system 202 may further include an intake air cleaner 212 and an intake air throttle 214.

The exhaust system 204 may include an exhaust pathway 216 coupled to the engine 200 through an exhaust manifold 218. The exhaust system 204 may further include a catalytic converter 220 and a lean NOx trap (LNT) 222. The catalytic converter 220 shown in this example is a three-way catalytic converter, disposed in the exhaust pathway, immediately downstream of the exhaust manifold 218. The LNT 222 is disposed in the exhaust pathway 216 downstream of the catalytic converter 220 and is shown in this example to include two subunits, LNT1 and LNT2, with LNT1 disposed upstream of LNT2.

The exhaust system may further include various temperature sensors disposed in the exhaust gas pathway 216. In this example, it may include exhaust temperature sensors 224 and 230. The temperature sensor 224 is shown disposed in the exhaust manifold 218. The temperature sensor 230 is disposed inside the LNT 222 at a location between the two LNT subunits: LNT1 and LNT2.

The exhaust system may further include various AFR sensors, such as universal exhaust gas oxygen sensors (UEGO) 226 and 232, heated exhaust gas sensors (HEGO) 228, and a NOx/UEGO sensor 234. These sensors may output signals indicative of exhaust oxygen content and intake air/fuel ratio, and may be viewed as oxygen sensor, hybrid oxygen sensor, or air/fuel ratio sensors or oxygen sensor. The NOx/UEGO sensor 234 may in addition output signals indicative of exhaust NOx content. In some examples, the AFR sensors may include heaters for heating the AFR sensors and the heaters may be turned on or off.

The UEGO sensor 226 is shown disposed downstream from the exhaust manifold 218 and immediately upstream of the catalytic converter 220. The HEGO sensor 228 is disposed immediately downstream of the catalytic converter. The UEGO sensor 232 is shown disposed downstream of the LNT 222 and upstream of the NOx/UEGO sensor 234.

The system may further include a control unit or controller 236, such as an engine control unit as provided in this example.

The system may include other components in addition to those discussed above. For example, the intake and exhaust systems may include a compression device, such as a turbocharger (not shown). The intake pathway may also include a surge tank to modulate the intake air pulsation.

Additional sensors, such as a pressure sensor, temperature sensors, and AFR sensors may also be provided at various positions in the intake and/or exhaust pathway. The location of the various sensors may be adjusted in different examples according to the particular engine specification. The intake and/or intake pathway may also include additional valves, such as one or more bypass valves, exhaust gas recirculation valves, and exhaust throttle valves, positioned at various locations in the intake/exhaust pathway.

The control unit 236 is shown to receive signal input from the various sensors, including those signals from exhaust temperature sensors (224, 230) and AFR sensors (226 and 232). For example, the control unit 236 may receive a signal indicative of exhaust temperature in the exhaust manifold 218 from the exhaust temperature sensor 224. It may also receive a signal indicative of exhaust temperature in the LNT 222 from the exhaust temperature sensor 230. Additionally, it may receive a signal indicative of oxygen content and/or NOx from the various AFR sensors. It may further receive signal indicative of intake throttle position via an intake throttle position sensor (not shown).

The control unit 236 is shown to receive various other signals from various sensors 238 in addition to those signals previously discussed, including but not limited to: mass air flow from a mass air flow sensor (not shown), engine coolant temperature from an engine coolant temperature sensor (not shown), absolute manifold pressure from manifold pressure sensor (not shown), engine speed from an engine speed sensor (not shown), fuel injector timing through a fuel injector timing sensor (not shown), etc.

The control unit 236 is shown to control the operation of various engine or vehicular components, such as the operation of intake throttle 214, fuel injector 206, exhaust temperature sensors 224 & 230, and/or UEGO sensors 226 & 232, and/or HEGO sensors 228. In particular, the control unit 236 may deactivate or activate the heater inside an AFR sensor.

In addition, the control unit 236 may control the amount of air and fuel to be delivered to engine cylinder, and/or provide a feedback control of the air/fuel ratio based on various AFR sensor signals and various other engine operation parameters. The control unit 236 may function to control the operation of the AFR sensor and the exhaust temperature sensor, as a part of an exhaust temperature sensor diagnostic system (not shown). The control unit 236 may furthermore function to monitor or diagnose the functionality of an exhaust temperature sensor as part of an exhaust temperature sensor diagnostic system (not shown). The control unit 236 may also function to estimate temperature contribution of an emission control device. The control unit 236 may function to recalibrate the exhaust temperature sensor if the control unit determines that an exhaust temperature sensor is malfunctioning and it is recalibratable.

The engine 200 may constitute one or more various types of internal combustion engines. Further, individual cylinders may operate in various combustion modes and/or various variable displacement modes, transition among different combustion and/or displacement modes, use different stroke cycles, and burn different types of fuels, etc.

Although only one exhaust pathway and one intake pathway are provided in this example, additional intake and/or exhaust pathways and/or bypasses may be provided. One or more exhaust recirculation pathways may also be provided.

Although one catalytic converter and one LNT (with two subunits) are provided as emission control devices in this example, other types of catalytic converters and/or additional emission control devices may be provided.

Figure 3:
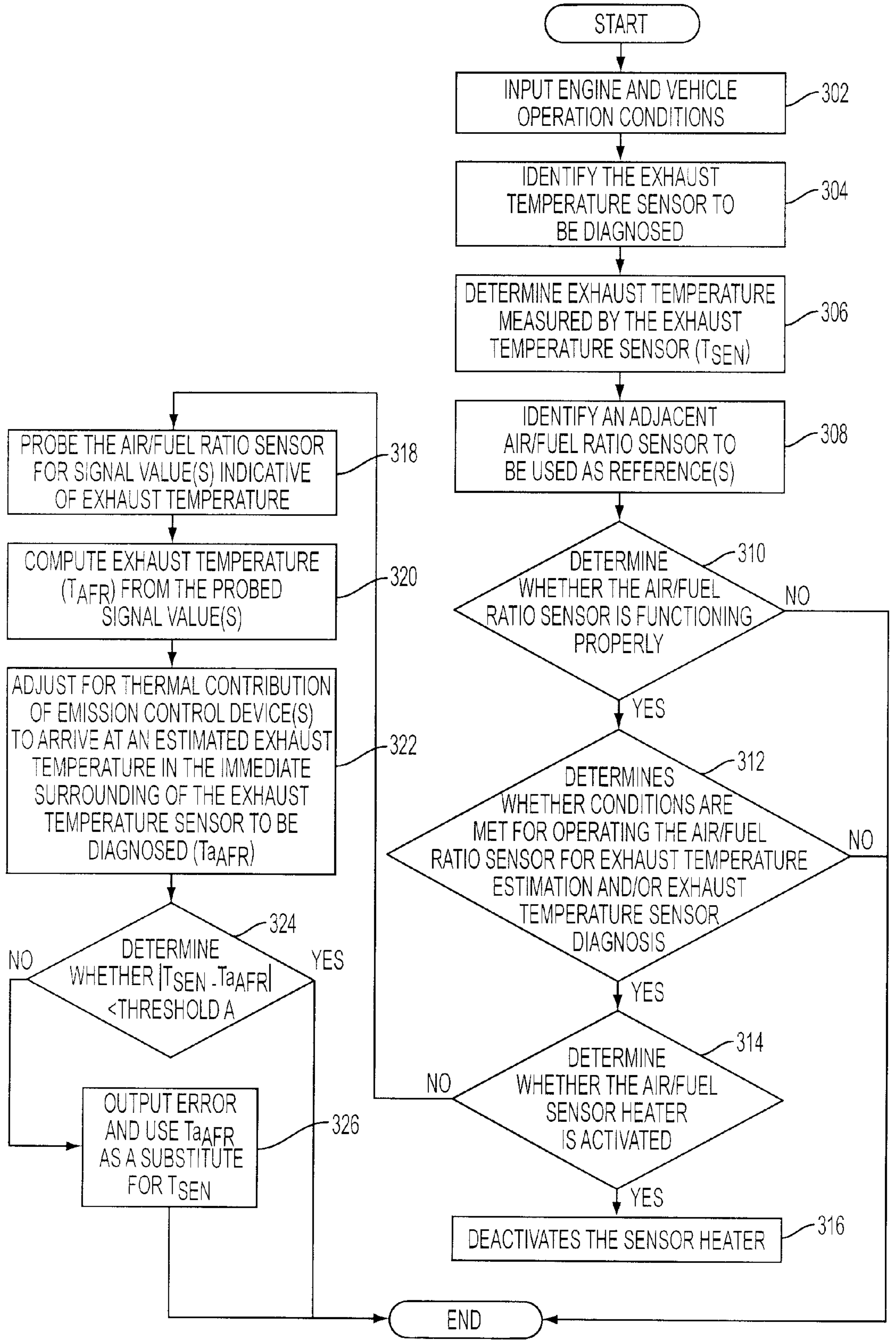
FIGS. 3-5 are high level flowcharts showing various example routines for diagnosing the functionality of an exhaust temperature sensor.
Figure 4:
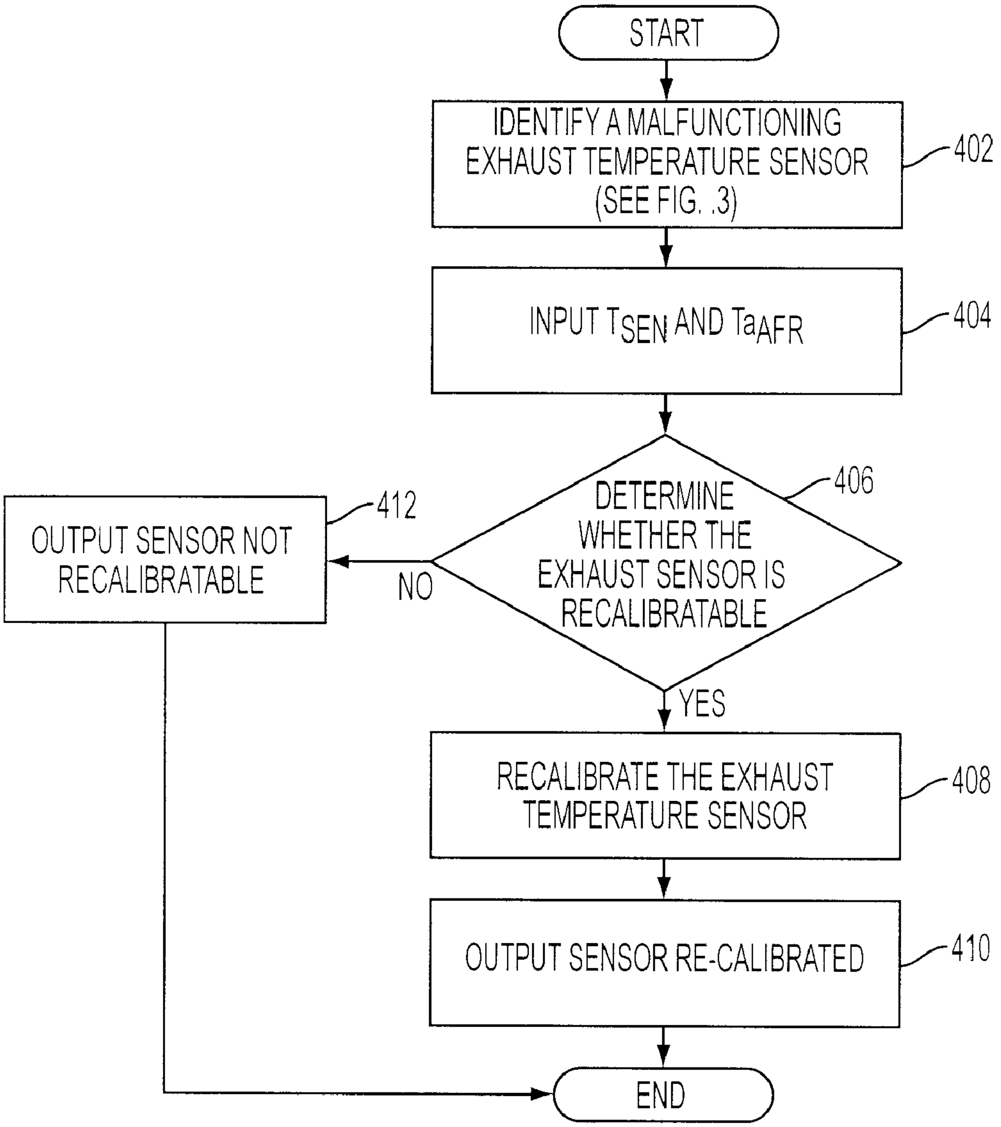
Figure 5:
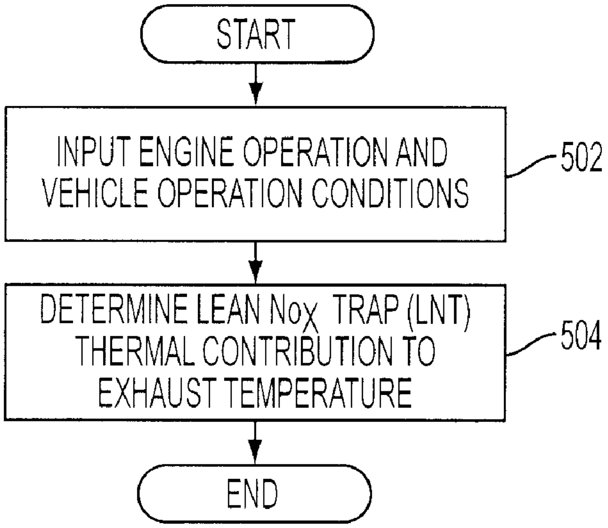

FIG. 3-5 show example routines for exhaust temperature estimation, exhaust temperature sensor malfunction diagnosis, and exhaust temperature recalibration by an exhaust temperature sensor diagnostic system as illustrated in FIGS. 1 & 2.

The specific routines described herein may represent one or more of any number of processing strategies such as event-driven, interrupt-driven, multi-tasking, multi-threading, and the like. As such, various steps or functions may be performed in the sequence illustrated, in parallel, or in some cases omitted. Likewise, the processing order is not necessarily required to achieve the features and advantages of the examples described herein, but is provided for ease of illustration and description. One or more of the illustrated steps or functions may be repeatedly performed depending on the particular strategy used. Furthermore, the described steps may graphically represent code to be programmed into the computer readable storage medium in a control unit and implemented by the control unit.

Although one AFR sensor is used for exhaust temperature estimation, exhaust temperature sensor diagnosis, and/or exhaust temperature sensor recalibration in the examples provided in FIGS. 3-5, multiple AFR sensors may be used in other examples. In such cases where multiple AFR sensors are used, an average of the temperature estimated by multiple AFR sensors may be obtained for the above purpose.

Although these routines only illustrate diagnosis of one exhaust temperature sensor, in other examples, multiple exhaust temperature sensors may be diagnosed either simultaneously or sequentially.

FIG. 3 is a high level flowchart of an example routine for diagnosing the functionality of an exhaust temperature sensor.

At 302, the routine inputs various engine and vehicle operation conditions, such as time since key-on and engine starts, engine coolant temperature, engine speed, exhaust temperature, and intake air/fuel ratio, etc.

At 304, the routine identifies an exhaust temperature sensor to be diagnosed.

At 306, the routine determines the temperature reading of the exhaust temperature sensor from one or more signal values received from the exhaust temperature sensor that are indicative of the exhaust temperature immediately surrounding the exhaust temperature sensor ($T_{SEN}$).

At 308, the routine identifies an AFR sensor for use as a reference. This reference may be the AFR sensor nearest to the exhaust temperature sensor requiring diagnosis.

At 310, the routine determines whether the AFR sensor is functioning properly. For example, the routine may compare the voltage output of the AFR sensor with a reference voltage to determine whether the AFR sensor is malfunctioning as a result of disconnection, a short circuit, or the like.

If the answer is affirmative, the routine proceeds to 312. If the answer is negative, the routine terminates.

At 312, the routine determines whether conditions are met for operating the AFR sensor for exhaust temperature estimation and exhaust temperature sensor diagnosis, such as, for example, whether the engine has just started or it is operating lean burn operation. If the answer is affirmative, the routine proceeds to 314. If the answer is negative, the routine terminates.

At 314, the routine determines whether the heater for the AFR sensor is activated, that is, whether the heater is turned on for the purpose of heating the AFR sensor. If the answer is affirmative, the routine proceeds to 316. If the answer is negative, the routine bypasses step 316 and proceeds directly to step 318.

At 316, the routine deactivates the AFR sensor heater, for example, by turning off the current supplied to the sensor heater for the purpose of heating the sensor.

At 318, the routine probes the AFR sensor for one or more signal value(s) indicative of the temperature of the exhaust surrounding the AFR sensor. For example, the routine may supply a small current to an AFR sensor heater to probe one or more static properties of the sensor heater, such as voltage, impedance, current, and/or heat quantity emitted of the AFR sensor heater; and/or to probe a dynamic property, such as dynamic properties of the sensor heater, such as time function of sensor heater voltage, impedance, current, and/or heat quantity emitted by the AFR sensor heater.

At 320, the routine computes exhaust temperature ($T_{AFR}$) from the probed signal value(s).

In some examples, the routine may computer $T_{AFR}$ based on a static sensor property, such as sensor heater impedance value using one or more correlation coefficients. In some examples, the routine may compute $T_{AFR}$ based on a time function of a sensor property, such as sensor heater impedance value. In some examples, engine and/or vehicle operating conditions are considered when determining correlation coefficients. For example, correlation coefficients correlating to the sensor heater impedance value to $T_{AFR}$ may vary depending on the exhaust flow, which in turn may vary depending on engine load.

In some examples, the computed $T_{AFR}$ may be used to provide an indication of the actual exhaust temperature.

At 322, the routine may adjust for the thermal contribution of one or more emission control devices to arrive at an adjusted AFR sensor estimated exhaust temperature ($T_{aAFR}$), which may more accurately reflect the exhaust temperature in the immediate surrounding of the exhaust temperature sensor to be diagnosed. (The thermal contribution of one or more emission control devices may be determined by routines, such as the one illustrated in FIG. 5.)

At 324, the routine compares $T_{SEN}$ and $T_{aAFR}$ and determines whether $|T_{SEN}-T_{aAFR}|$ is within a predetermined threshold value A (e.g., A=5° C.). If the answer is affirmative, the routine terminates. If the answer is negative, the routine proceeds to 326.

At 326, the routine outputs ERROR and may substitute $T_{aAFR}$ for $T_{SEN}$ as an indication of the exhaust temperature in the vicinity of the exhaust temperature sensor to be diagnosed for engine and vehicle operation.

FIG. 4 is a high level flowchart of an example routine for recalibrating the exhaust temperature sensor.

At 402, the routine identifies a malfunctioning exhaust temperature sensor. This may be carried out by a routine as shown in FIG. 3.

At 404, the routine inputs the exhaust temperature measured by the malfunctioning exhaust temperature sensor ($T_{SEN}$) and inputs the adjusted AFR sensor estimated exhaust temperature ($T_{aAFR}$).

At 406, the routine determines whether the exhaust temperature sensor may be recalibrated. For example, if the absolute difference between $T_{SEN}$ and $T_{aAFR}$ is smaller than a predetermined threshold value B (e.g., 50° C.), it may indicate that the sensor may be recalibratable.

If the answer is affirmative, the routine proceeds to 408. If the answer is negative, the routine proceeds to 412.

At 408, the routine recalibrates the malfunctioning exhaust temperature sensor by, for example, resetting the resistance of the exhaust temperature sensor.

In one example, the control unit 124 may determine that the resistance for an exhaust temperature sensor positioned in an LNT has drifted upwards due to corrosion, that is, the exhaust temperature sensor resistance increased for a given exhaust temperature. A temperature sensor resistance offset ($R_{offset}$) is calculated and the actual exhaust temperature sensor resistance ($R_a$) for temperature measurement is determined using the following equation:

$$R_a=R_p+R_{offset}$$

where $R_p$ is the sensor resistance value before recalibration.

In another example, the control unit 124 may determine that the exhaust temperature sensor has a partial loss of electrical isolation to ground of the sensor thermistor. In this case, a shunt effect ($R_{snt}$) may be calculated and the actual exhaust temperature sensor resistance ($R_a$) for temperature measurement is determined using the following equation:

$$R_a=R_p*R_{snt}/(R_{snt}+R_p)$$

where $R_p$ is the sensor resistance value before recalibration.

In yet another example, the control unit 124 may determine the relationship between the actual exhaust temperature ($T_{ACTUAL}$), as determined, for example, by one or more AFR sensors, and the exhaust temperature read from the exhaust temperature sensor to be calibrated ($T_{SEN}$), and, in turn, correct the exhaust temperature sensor temperature reading based on this determined relationship. In this example, the control unit 124 may correct the exhaust temperature sensor on the basis of the following determined linear relationship or equation between $T_{ACTUAL}$ and $T_{SEN}$:

$$T_{ACTUAL}=aT_{SEN}+b$$

At 410, the routine outputs SENSOR RECALIBRATED.

At 412, the routine outputs SENSOR NOT RECALIBRATABLE.

FIG. 5 is a high level flowchart of an example routine for determining the thermal contribution of an emission control device, such as a lean NOx trap (LNT).

At 502, the routine inputs engine and vehicle operation conditions.

At 504, the routine determines the contribution of the emission control device to the exhaust temperature using an emission control device thermal model.

The LNT temperature at the end of the rich burn operation may be a function of the amount of oxygen and NOx captured at the beginning of the rich burn operation and a function of the initial LNT temperature at the beginning of the rich burn operation. The amount of oxygen and/or NOx captured at the beginning of the rich burn combustion may be determined from oxygen sensor measurements, and/or determined from engine operating conditions.

The temperature of the LNT at the beginning of rich burn combustion may be determined from measurements of adjacent temperature sensors and/or various AFR sensors disposed at various locations in the exhaust pathway.

Figure 6:
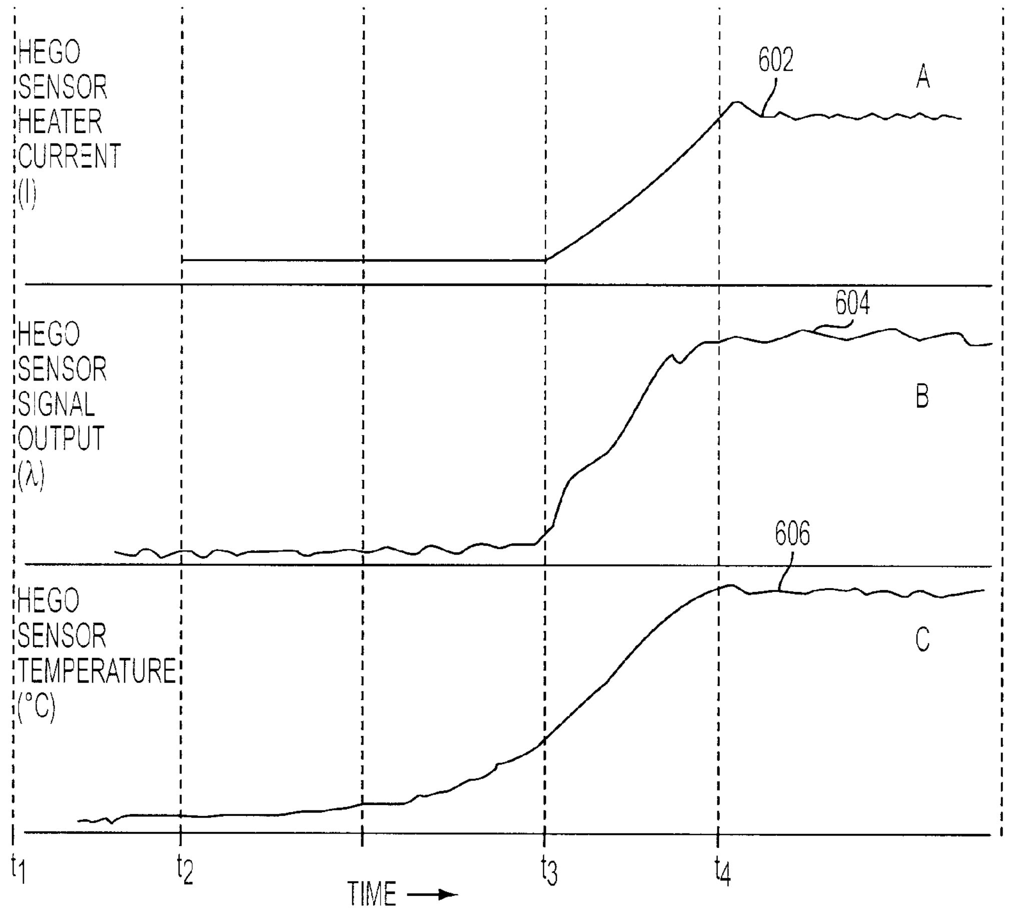
FIG. 6 illustrates a relationship between sensor heater current, sensor output, and sensor sensed exhaust temperature at engine start for a HEGO sensor positioned in an exhaust pathway during engine cold start.

FIG. 6 illustrates an example relationship amongst a HEGO sensor heater current, sensor output, and sensor temperature at engine cold start.

Line 602 illustrates how the HEGO sensor heater current changes over time. At time t1, the ignition key is on and the sensor heater is deactivated. During the time period from t1 to t2, the sensor heater is off and no electric current passes through the heater sensor. During the time period from t2 to t3, a small electric current passes through the sensor heater for sensor heater resistance measurement. During the time period from t3 to t4, the current passing through the sensor heater is ramped up for sensor heating. The current more or less stabilizes beyond time t4 during a feedback temperature control of the sensor.

Line 604 illustrates how the HEGO sensor signal output changes over time. During the time period from t1 to t3, a relatively small signal is outputted by the HEGO sensor since the HEGO sensor is not in its operating temperature range. During the time period from t3 to t4, the HEGO sensor signal output gradually increases as the sensor temperature increases. Beyond t4, the HEGO sensor reaches its operation temperature range and the HEGO sensor signal is proportional to the exhaust oxygen content.

Line 606 illustrates how the HEGO sensor temperature changes over time. During the time period from t1 to t3, the sensor heater is deactivated, that is it is not turned on for the purpose of heating the sensor, the HEGO sensor temperature drifts upwards as engine and exhaust warm up. During the time period from t3 to t4, the sensor heater is activated, that is it is turned on for the purpose of heating up the sensor, the HEGO sensor temperature increases rapidly. Beyond t4, the sensor temperature is maintained at its operation temperature.

Figure 7:
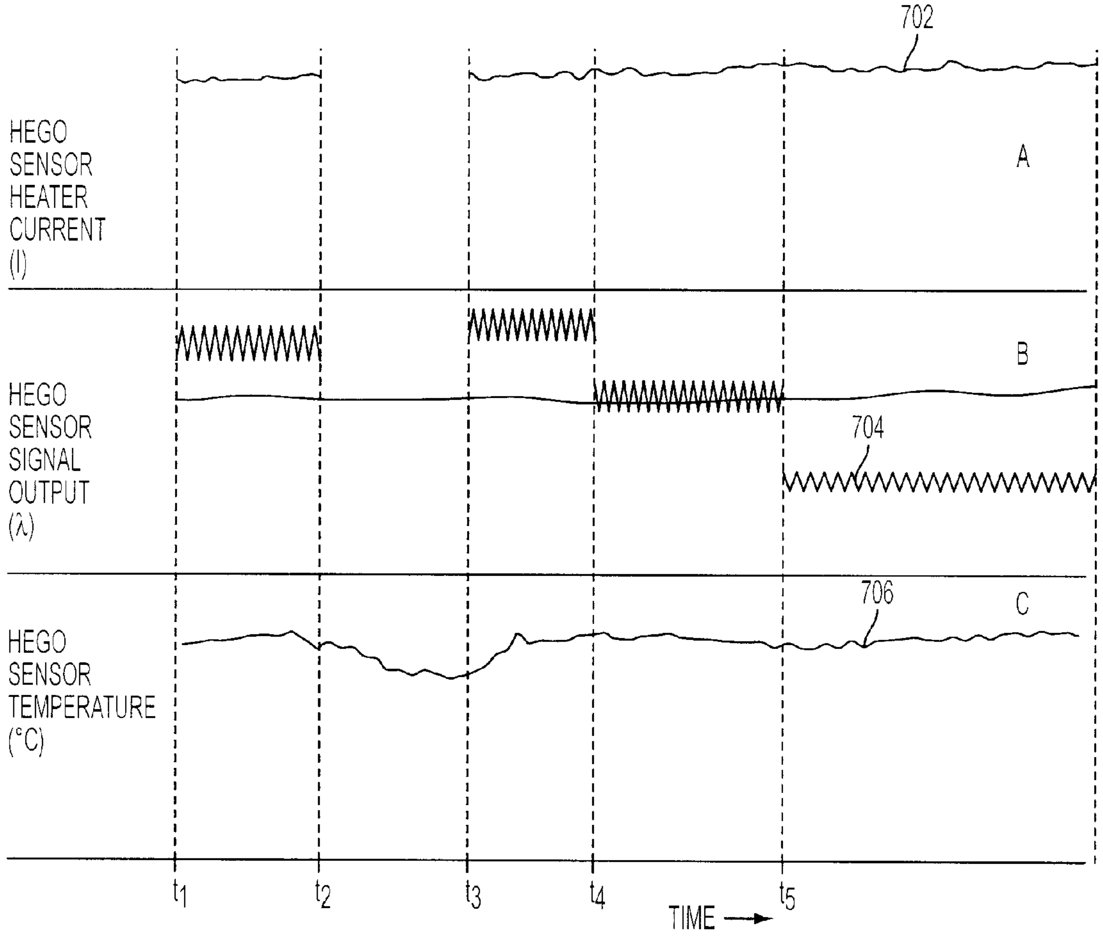
FIG. 7 illustrates a relationship between sensor heater current, sensor output, and sensor sensed exhaust temperature for a HEGO sensor positioned in an exhaust pathway during lean burn, stoichiometric, and rich burn combustion.

FIG. 7 illustrates a relationship between a HEGO sensor heater current, sensor output, and sensor temperature during lean burn, stoichiometric, and rich burn engine operations.

The engine is in lean burn mode for the time period from t1 to t3. The engine is in stoichiometric mode for the time period from t4 to t5 (which may include oscillation about stoichiometry, for example). The engine is in rich burn mode for the time period beyond t5. During the time period from t2 to t3, the HEGO sensor heater may be deactivated and used for temperature estimation or measurement, as well as diagnostics of other exhaust and/or emission control device temperature sensors.

Line 702 illustrates changes in the HEGO sensor heater current over time. Line 704 illustrates changes in the HEGO sensor signal output over time. Line 706 illustrates changes in the HEGO sensor temperature over time.

Figure 8:
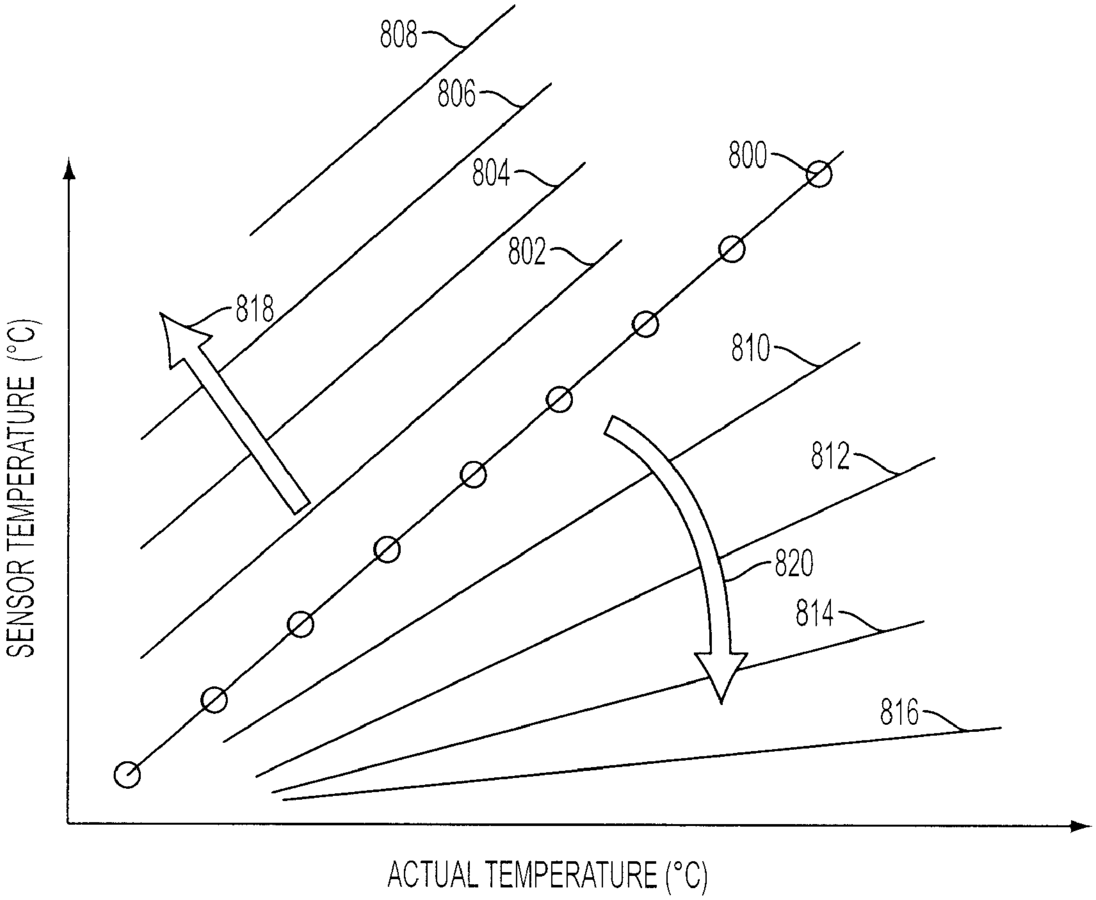
FIG. 8 illustrates exhaust temperature sensor drifts due to corrosion and partial loss of electrical isolation to ground of the sensor thermistor.

FIG. 8 illustrates example exhaust temperature sensor drifts due to sensor degradation. The exhaust temperature measured by an exhaust temperature sensor is plotted against the actual exhaust temperature to give sensor characteristics lines.

Line 800 represents the original exhaust temperature sensor characteristics line.

Lines 802 to 808 represent exhaust temperature sensor drifts due to increases in sensor resistance caused by sensor corrosion. Arrow 818 indicates the direction of the drift. As the sensor corrosion increases, the intercept of the sensor characteristic line is shown to drift upwards while the slope of the sensor remains more or less the same. Lines 802, 804, 806, and 808 are the sensor characteristics lines when the sensor resistance is increased by 50 ohms, 150 ohms, 350 ohms, and 500 ohms respectively.

Lines 810 to 816 represent sensor drifts due to a partial loss of electrical isolation to ground of the thermistor owing to contamination in the housing of the sensor. Arrow 820 indicates the direction of the sensor drift. The slope of the sensor characteristics line decreases as the contamination in the sensor and the partial loss of electrical isolation to ground of the thermistor increases. Lines 810, 812, 814, and 816 are the sensor characteristic lines when the shunt effect is 50 k Ohms, 2 k Ohms, 1000 Ohms, and 500 Ohms respectively.

The following claims particularly identify certain combinations and subcombinations regarded as novel and nonobvious. These claims may refer to "an" element or "a first" element or the equivalent thereof. Such claims should be understood to include one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system for diagnosing an exhaust temperature sensor in an engine exhaust, the exhaust further including an emission control device, the system comprising an exhaust temperature sensor disposed in the exhaust pathway for indicating temperature;

an air/fuel ratio sensor having a heater, the air/fuel ratio sensor disposed in the exhaust pathway; and a control system, the control system enabling and disabling the air/fuel ratio sensor heater based on operating conditions, the control system further adjusting fuel injection to provide a desired air-fuel ratio based on feedback from the air/fuel ratio sensor when the heater is enabled, and determining degradation of the exhaust temperature sensor based on a signal from the air/fuel ratio sensor when the heater is disabled.

2. The system of claim 1 wherein the control system disables the heater during engine warm-up from a cold start at or before a dew-point is reached.

3. The system of claim 1 wherein the control system disables the heater during lean combustion.

4. The system of claim 1 wherein the control system estimates exhaust temperature after disabling the heater and based on a static signal from the air/fuel ratio sensor that is indicative of the exhaust temperature.

5. The system of claim 4 wherein the said static signal is indicative of a static electrical property of the air/fuel ratio sensor.

6. The system of claim 5 wherein the static signal is indicative of impedance of the air/fuel ratio sensor.

7. The system of claim 1 wherein the control system estimates exhaust temperature after disabling the air/fuel ratio sensor heater based on a time based signal from the air/fuel ratio sensor.

8. The system of claim 7 wherein the said time based signal is a signal that decreases in strength as temperature increases.

9. The system of claim 7 wherein the said time based signal is a signal that increases in strength as temperature decreases.

10. The system of claim 1 wherein the said control system recalibrates the exhaust temperature sensor based on the signal from the air/fuel ratio sensor when the heater is disabled.

11. The system of claim 10 wherein the said control system recalibrates the exhaust temperature sensor by correcting an exhaust temperature measured by the exhaust temperature sensor prior to the calibration, with one or more relationships that correlate the exhaust temperature determined on the basis of the air/fuel ratio sensor signal and the exhaust temperature measured by the exhaust temperature sensor.

12. The system of claim 11 wherein the one or more relationships is a linear relationship.

13. The system of claim 1 wherein the exhaust temperature sensor is disposed in an emission control device.

14. The system of claim 1 wherein the said signal from the air/fuel ratio sensor is adjusted for thermal contribution of one or more emission control devices to the exhaust temperature.

15. A method for diagnosing an exhaust temperature sensor functionality, comprising operating an exhaust temperature sensor disposed in an exhaust pathway to sense a first signal indicative of an exhaust temperature;

operating one or more air/fuel ratio sensors disposed in the exhaust pathway based on engine operating conditions to sense a second signal indicative of an exhaust temperature while de-energizing a heater of the air/fuel ratio sensor; and operating a control system for diagnosing the exhaust temperature sensor functionality based on the air/fuel ratio sensor(s) sensed signal, and the exhaust temperature sensor sensed signal.

16. The method of claim 15 wherein the said engine operating conditions indicate engine warm-up from a cold start at or before a dew-point is reached.

17. The method of claim 15 wherein the said engine operating conditions indicate engine lean burn combustion.

18. The method of claim 15 wherein the said engine operating conditions indicate engine rich burn combustion.

19. The method according to claim 15, wherein the said air/fuel ratio sensor sensed signal is adjusted for thermal contribution of the one or more exhaust emission control device(s) to the exhaust temperature prior to being used as a basis for diagnosing the exhaust temperature sensor functionality.

20. A system for diagnosing an exhaust temperature sensor in an engine exhaust, the exhaust further including an emission control device, the system comprising an exhaust temperature sensor disposed in the exhaust pathway for indicating temperature of the emission control device;

a switching exhaust gas oxygen sensor having a heater, the switching exhaust gas oxygen sensor disposed in the exhaust pathway proximate the emission control device; and a control system, the control system enabling and disabling the heater based on operating conditions, where the heater is disabled during engine warm-up from a cold start before a dew-point is reached in the switching exhaust gas oxygen sensor, the control system further adjusting fuel injection to provide a desired air-fuel during stoichiometric operation ratio based on feedback from the switching exhaust gas oxygen sensor when the heater is enabled, and determining degradation of the exhaust temperature sensor based on a signal from the air/fuel ratio sensor when the heater is disabled.

* * * * *